INVENTOR

INVENTOR
Peter Weisshuhn

INVENTOR

United States Patent Office 3,565,730
Patented Feb. 23, 1971

3,565,730
APPARATUS FOR FORMING THERMOPLASTIC
WINDOWS ON ENVELOPES, BAGS OR BOXES
Peter Weisshuhn, 204–1985 Bellevue Ave., West
Vancouver, British Columbia, Canada
Filed Jan. 24, 1968, Ser. No. 705,259
Claims priority, application Canada, Jan. 31, 1967,
981,637
Int. Cl. B32b 3/00
U.S. Cl. 156—500
10 Claims

ABSTRACT OF THE DISCLOSURE

Continuous method of forming thermoplastic windows in a moving web of envelope, bag, box, etc. material. Cutting window openings in the web, preheating, passing the preheated web through a nip in contact with an extruded strip of thermoplastic film, bonding in the nip by heat and pressure. End product is a web with thermoplastic windows formed at spaced intervals, this web suitable for leading to feed rolls of conventional converting machine, so that it directly produces windowed articles. Apparatus has a cooling roll having depressed areas with a cooling area therebetween, cooling being by compressed air. Heated knife blades of the roll, or air jets, cut the film suitably with unutilized sections urged through a cavity in floor of depressed area to a hollow shaft for reprocessing. Electrostatic pinning of the film to the roll.

FIELD OF THE INVENTION

This invention relates to a method and apparatus for forming thermoplastic window coverings on envelopes, bags, boxes, and like articles.

BACKGROUND OF THE INVENTION

The present system of manufactured window envelopes utilizes a continuous flow operation with an opening being cut in a running web of sheet material, for instance paper. Over the opening, hereinafter a cut-out or window cutout, a transparent piece of sheet material is next applied by gluing. The web is then suitably cut, folded and glued to produce a finished window envelope, bag, box, or other article, as the case might be. Competition in paper converting industry, and sales competition, has resulted in many attempts to lower production and material costs.

The present invention provides a method and apparatus by means of which thermoplastic windows are provided for such articles in a combined paper converting machine without reduction in its production rate. The present invention provides apparatus by means of which the production of thermoplastic windows, their attachment to such articles can be automatic and, since thermoplastic windows can be made of a thin inexpensive thermoplastic sheet material, produces window envelopes, bags, or boxes, which can be marketed at a price substantially the same as that of a windowless product.

OUTLINE OF THE INVENTION

The present invention provides for a strip of thermoplastic film to be extruded continuously to cover the window cut-out, and to be bonded by heat sealing over a narrow peripheral area surrounding the cut-out, while the web and plastic film strip are running.

A section of the plastic film strip, which is not bonded to the paper and not utilized as a window, is cut off and reused substantially entirely. The thermoplastic window can be applied to sheet material other than paper, provided good bonding is feasible. Polystyrene resin, which is crystal clear of high impact strength, easy to extrude in thin sheet or film form, and reusable, is suitable for use herein.

The apparatus for forming windows on the continuous paper web has a pressure cylinder and a cooling cylinder in rolling engagement with each other and forming a nip through which the paper web and plastic film pass. The cooling cylinder has a surface with a number of depressed floor areas with slots for retractable knives to cut leading and trailing edges of the plastic film. A cavity is provided for extraction of unutilized film. Cooling is by air.

In one embodiment of the invention, the cutting of the thermoplastic strip is effected by electrical induction heated knives, and in another embodiment the plastic film is cut by jets of high pressure air. In a further embodiment of the invention more than one thermoplastic film strip is extruded onto the cooling cylinder at the same time.

The method and apparatus produce a web of material in which plastic windows have been formed. As before implied, this web can be fed directly to feed rolls of a converting machine without material alteration to the machine. Instead of a roll of plain material being fed to the machine, it can now be supplied with a web having windows already formed. Thus the machine, unaltered, can directly produce window envelopes, bags, boxes, or as the case may be.

A detailed description following, related to drawings, describes exemplary embodiment of the invention in method, and in apparatus means. The invention is capable of expression in method, and in means, other than particularly described.

PREFERRED EMBODIMENT

Figure 1:
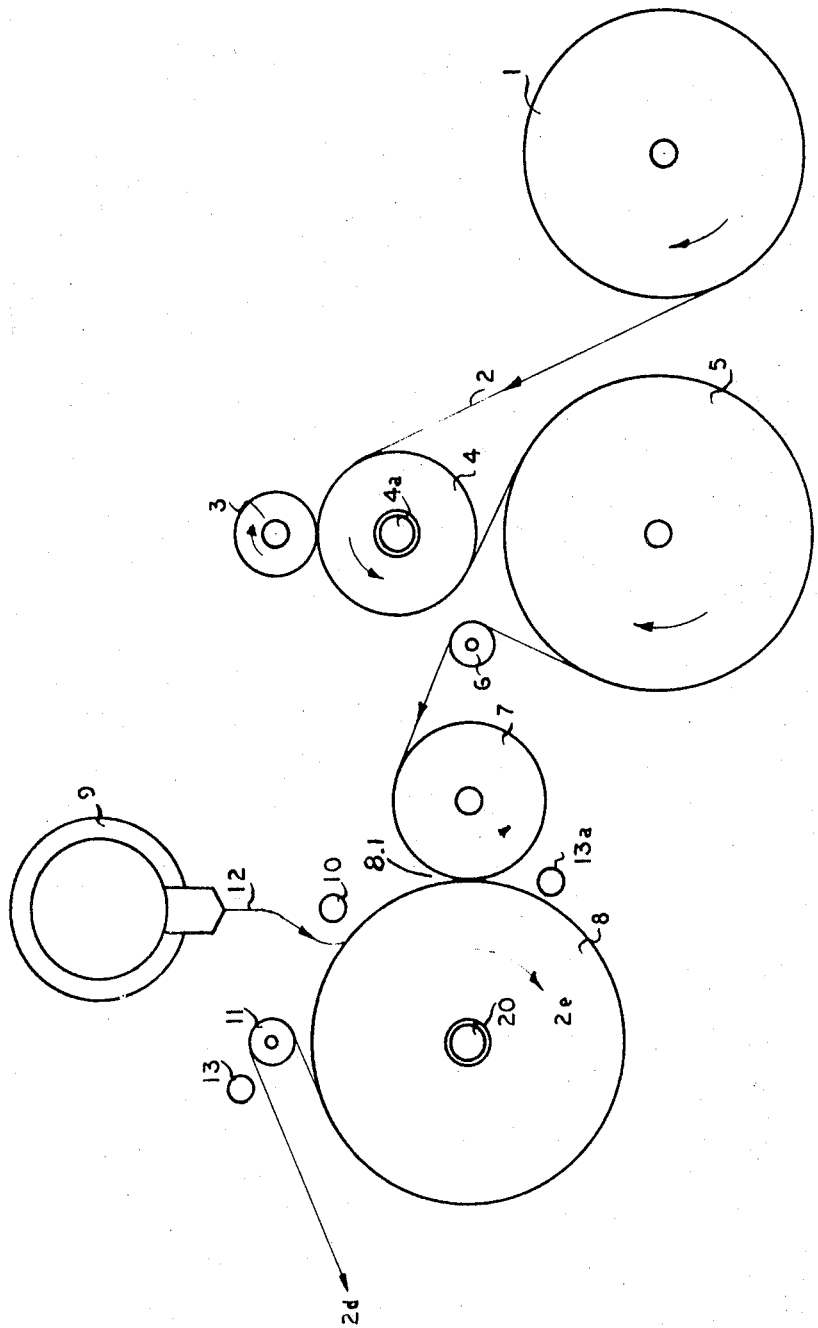
FIG. 1 is a diagrammatic side elevation of the apparatus of this invention in general, indicating travel of the web.

Description related to FIG. 1

In FIG. 1 a paper roll 1 is rotating in a direction shown by an unreferenced arrow so that a running web 2 of paper unwinding from the paper roll travels to a rotary knife, or fly knife, 3 and a counter roll 4 having a vacuum system 4a. The web 2 passes over the counter roll 4 as shown, the fly knife making cut-outs (such as shown at 2a FIG. 2) for window openings in the travelling web, with the cut-out web portions being extracted by the vacuum system 4a.

The web passes to a preheated cylinder 5 which rotates as shown by an unreferenced arrow. The preheated cylinder heats the paper web to a temperature, as known in the art, sufficient to facilitate good and easy bonding of thermoplastic film strip to the paper. The moving web, after heating, passes over a guide roller 6 to a pressure cylinder 7 in operative engagement with a cooling cylinder 8 providing a nip 8.1 therebetween. A thermoplastic extruder of known commercial design is designated 9, and an electrostatic pinning applicator bar 10 is provided adjacent the cooling cylinder 8. The web having passed around the cooling cylinder 8 passes over a guide roller 11 in a direction 2d directly to feed rolls of an envelope bag or box making, or converting, machine not shown. A thermoplastic film strip 12 is extruded from the extruder 9 in a direction indicated by an unmarked arrow the extruded strip being aligned with the web at the nip and, before reaching the nip, passing adjacent the electrostatic pinning applicator bar 10 which pins the thermoplastic strip to the cooling cylinder 8 in advance of the nip 8.1 between the pressure cylinder and the cooling cylinder. Thus the thermoplastic strip is bonded to the heated web at the nip by rolling pressure and heat. When the web with the thermoplastic strip bonded thereto has passed through the nip, a static bar 13a removes most of the electrostatic charge from the web. A second static bar 13 adjacent to the guide roller 11 removes any residual charge.

Extrusion of the plastic strip from the extruder is continuous and at a rate less than the running speed of the paper web, that is to say, is less than the peripheral speed of the cooling cylinder. This is to strain the extruded film to reduce it to a required thickness.

Pinning effected by the electrostatic pinning applicator bar 10 and removing the static charge are well known, so are not further described herein. Continuous bonding of thermoplastic material to paper is also well known, being carried out by coating a travelling paper web by extrusion of plastic resin in a plastic condition. In FIG. 1, this is effected by feeding the plastic material and the paper through the nip in alignment between the pressure cylinder and the cooling cylinder, the plastic strip being on the surface of the cooling cylinder. The cooling roller cools the soft plastic film strip.

Figure 2:
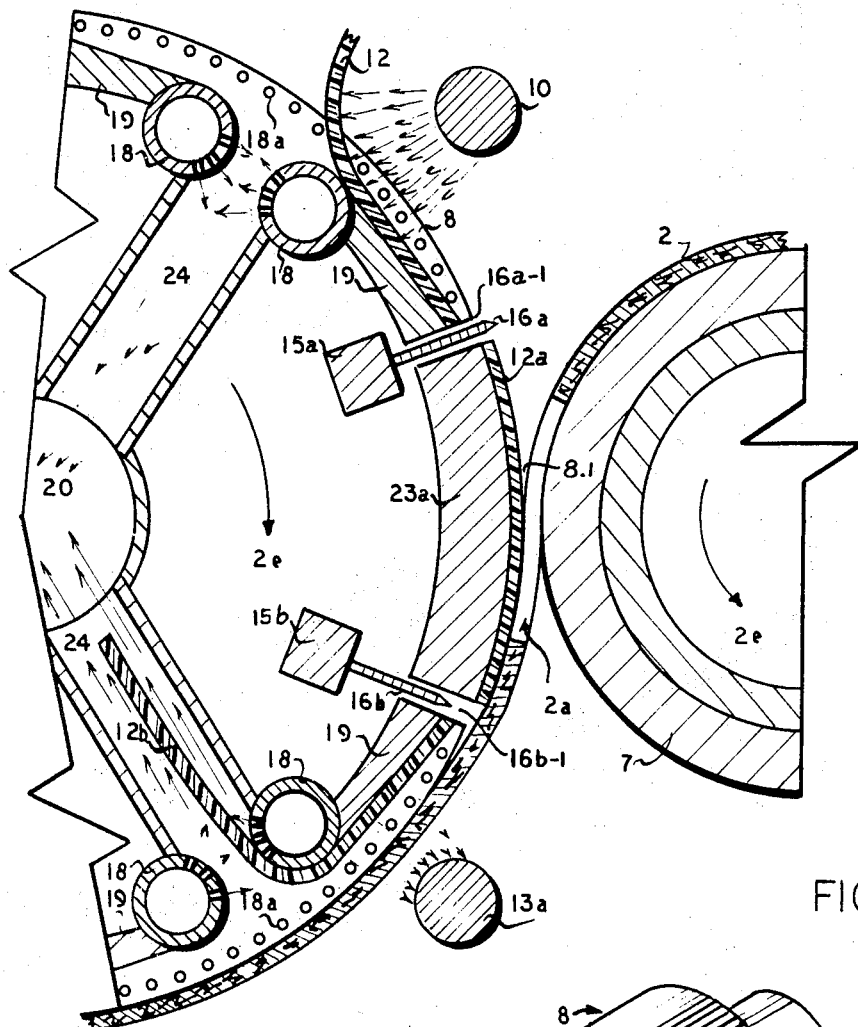
FIG. 2 is a detail section through a pressure cylinder and a cooling cylinder, the cooling cylinder being provided with knives heated by electrical induction means.
Figure 3:
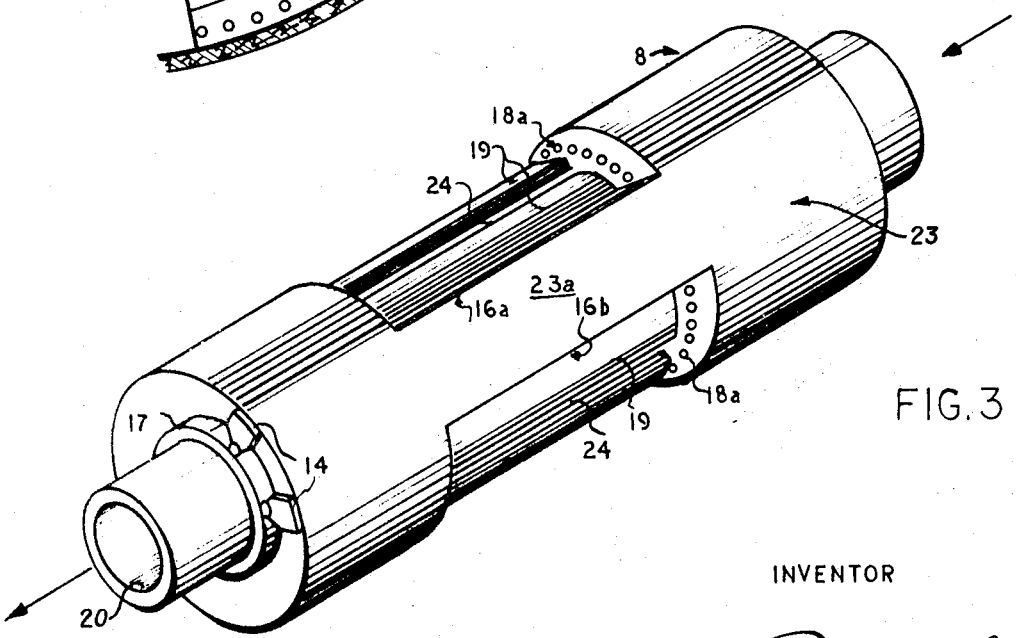
FIG. 3 is an isometric view of the cooling cylinder.

Description related to FIGS. 2 and 3

The knives are guided and held by elements 14 seen in FIG. 3 only. A knife holder 15a of FIG. 2, has a second knife blade 16a secured thereto as shown, and a knife holder 15b has a first blade 16b, the knife holders being moved radially inwards and outwards by a cam 17, FIG. 3, acting upon the guides 14. The blades are extended and retracted through slots, later described, of a side wall of the cooling cylinder 8, and retracted clear of the cylinder 8, with movement of the holders. The second knife blade 16a is shown extended through the side wall of the cooling cylinder 8, having cut the thermoplastic film strip 12 in advance of the nip, and the knife 16b is shown retracted clear of an outer surface of the said wall. The cuts produce a plastic window portion 12a having a leading edge cut by the first blade 16b, and a trailing edge cut by the second blade 16a. The plastic window portion has a length defined by the leading and trailing edges, which length exceeds that of the window-cut-out 2a by an amount sufficient to provide for top and bottom peripheral sealing. In passing through the nip the cut-out and the window portion are in register as shown so that top and bottom peripheral sealing widths are the same. It is clear that the leading edge was cut by the first blade 16b when it was in the position at which the second blade 16a is shown in FIG. 2, i.e. both cuts are made in advance of the nip, the blades being means to cut the thermoplastic film in advance of the nip. Cooling is effected by air jets from manifolds 18 FIG. 2, with the manifolds directing jets of air against a cut-off section of plastic 12b entering a cavity 24 communicating with a hollow shaft 20 of the cooling cylinder 8. The cavity 24 has walls of, or lined with, for instance a ceramic, material so that the cut-off 12b can pass freely through the cavity unimpeded by electrostatic adhesion effects.

A cylindrical side wall of the cooling cylinder 8 is designated 23, with depressions being formed therein defined by spaced circumferential side walls and first and second end walls. The depressions have depressed floor areas 19. A cooling surface 23a of the cylindrical side wall 23 is defined between depressions. The side walls defining the depressions have perforations 18a through which cooling air is discharged to play over the depressed floor areas, the blades being disposed adjacent the end walls and passing respectively through first and second slots 16b–1 and 16a–1 defined in part by the end walls aforesaid. The depressions have a width between the spaced circumferential side walls greater than that of the plastic strip.

With rotation being in a direction as indicated by arrows 2e, FIG. 2, the cam 17 is constructed and arranged so that after cutting has taken place, each blade is retracted before reaching the nip and extended to cut in advance of the nip.

As before explained, the static bar 13a removes the static charge, this releases the cut-off portion 12b so that it is free to travel radially inwards of the cavity 24 being drawn inwards by suction, the cut-off portion then passes to a cyclone chamber, not shown, after which the unused strips are granulated and blended with new resin before conveyed to the extruder for reuse, as known in the art.

The blades 16a and 16b are heated to about 300° F., since the melting temperature of the plastic is around 200°. Heating is by separate electrical induction means, not shown. The use of blades so heated for cutting plastic is known, consequently the heating means is not further described herein.

In FIG. 2 and FIG. 3, it is seen that the blades 16a and 16b are disposed within the depressed areas adjacent to side walls thereof. A cut-off produced by the fly knife 3 (FIG. 1) is designated 2a, the cut-out registers centrally of the area 23a and has a width, measured in the direction of motion of the web, less than that of the undepressed cooling surface 23a so as to provide a relatively narrow peripheral strip which is bonded to the web by passage through the nip. As seen in FIG. 2, the cut-off section 12b of the thermoplastic strip not used to form the window is pinned to the depressed floor 19, hence only the portion 12a of the cut film between adjacent knives and pinned to the outer surface of the cylinder is bonded in passing through the nip.

Figure 4:
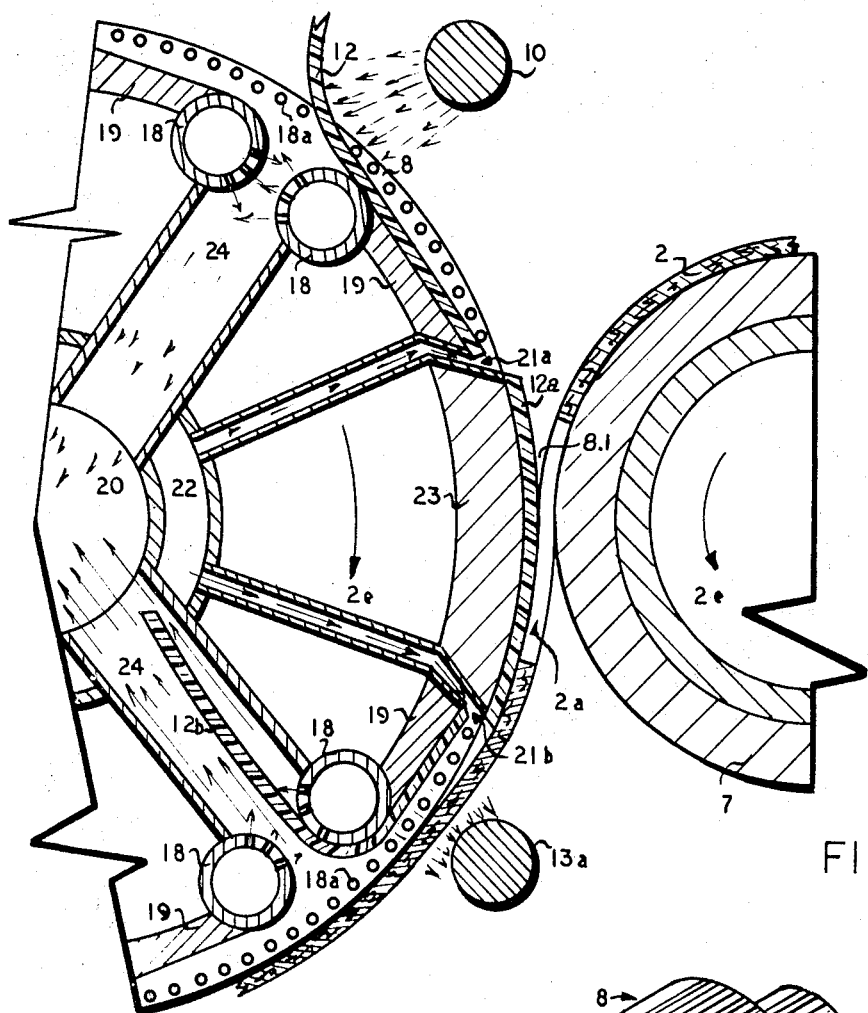
FIG. 4 is a detail section of the cooling and pressure cylinder of the embodiment of FIG. 1 taken at the nip therebetween, showing the position of the paper web and thermoplastic film strip being cut by the air jet.
Figure 5:
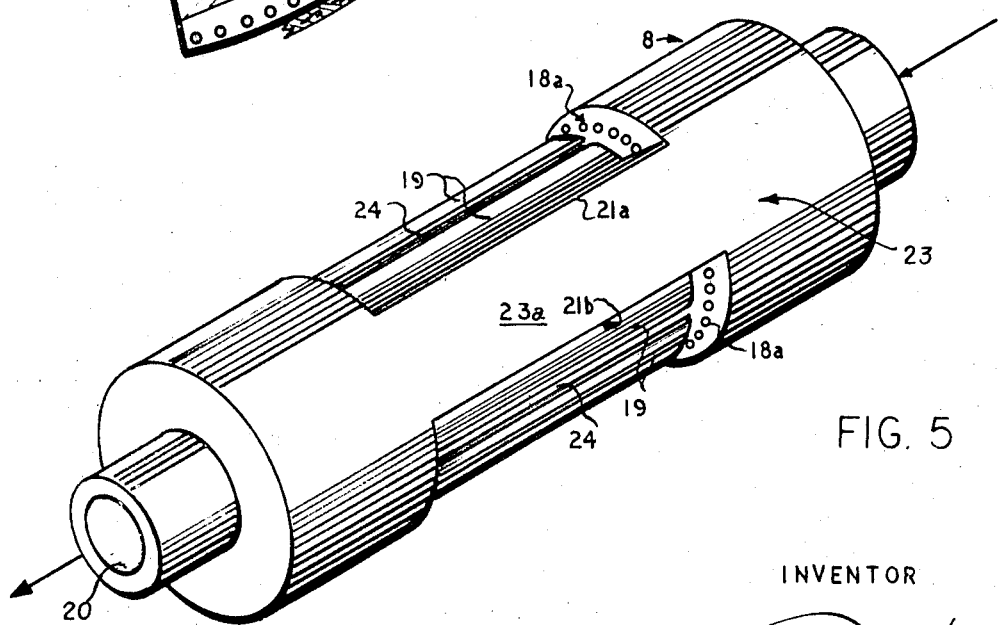
FIG. 5 is an isometric view of a cooling cylinder used with air pressure cutting.

Description related to FIGS. 4 and 5

FIGS. 4 and 5 show an air pressure knife system for cutting the plastic strip. The cooling cylinder 8 of FIGS. 4 and 5 generally resembles that shown in FIGS. 2 and 3 differing therefrom in that, instead of heated knives for cutting the plastic, air pressure jets are used.

A pressure tube 22 is coaxial of the hollow shaft 20 providing a generally annular space as seen in FIG. 4. Compressed air from a supply source not shown enters the tube 22 and is discharged through outer ends slots 21a, 21b. The slots are disposed generally as described with reference to the blades 16a, 16b, FIG. 2 and cutting of the film 12 as previously described is effected by the discharge of jets compressed air through the slots.

Figure 6:
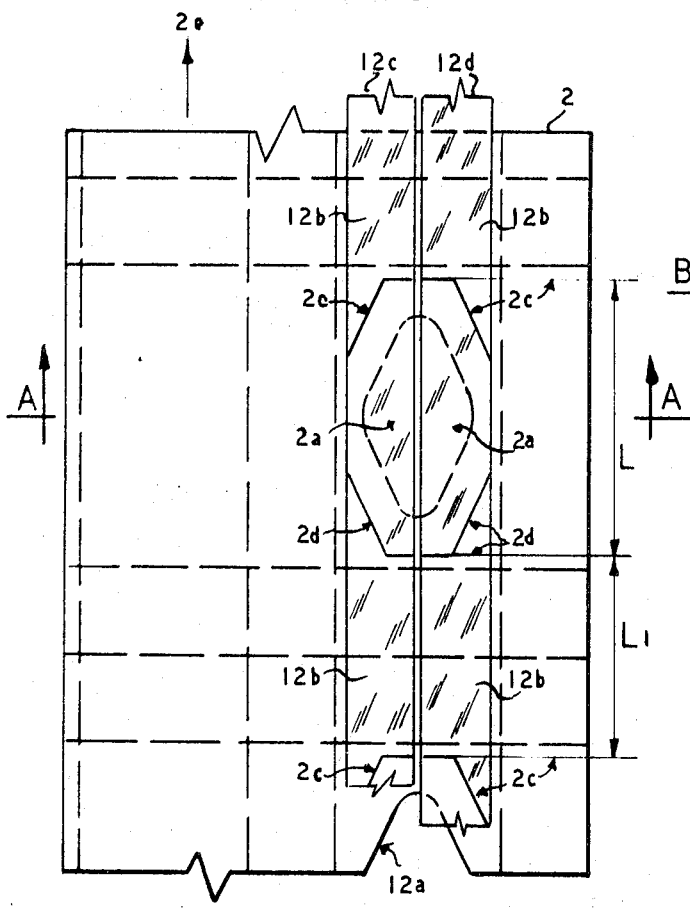
FIG. 6 is a plan of a folding carton web with two reinforced thermoplastic strips.
Figure 7:
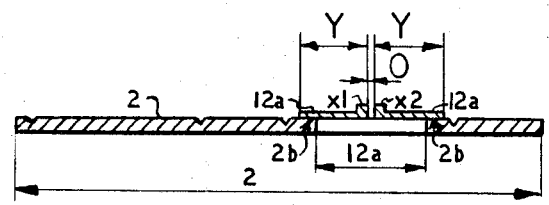
FIG. 7 is a section A—A of FIG. 6.

Description related to FIGS. 6 and 7

FIG. 6 shows embodiment of the invention indicating application of two thermoplastic strips to a folding carton, the two strips forming a window on a cut-out of a box. The strips are spaced by a small distance defining a narrow slot so that, for example facial tissues, can be taken out through the opening.

On a running web 2 of box carton material moving in the direction shown by an arrow 2e, two parallel plastic strips 12c and 12d cover the window cut-out 2a of the carton material, defining the narrow slot which has a width O FIG. 7.

The two strips are extruded from the extruder 9 (FIG. 1) through a common nozzle adapted to extrude parallel strips as aforesaid. As later described, adjacent edges of the strips as extruded are thickened to provide reinforced edges for the slot. Each film strip is cut along lines 2c and 2d producing an eight sided centrally slotted window covering a generally similarly shaped smaller cut-out 2a of the web. The window is bonded peripherally to the carton around the cut-out 2a as seen at 2b FIG. 7. The rest of the film which is not bonded and not utilized is drawn off.

Section A—A, FIG. 7, shows the window portion 12a of width of Y spaced to form the gap of width O. The extruded material is thickened at adjacent edges, the thickening is seen at $x1$ and $x2$. This provides edge reinforcement for the slot.

Figure 8:
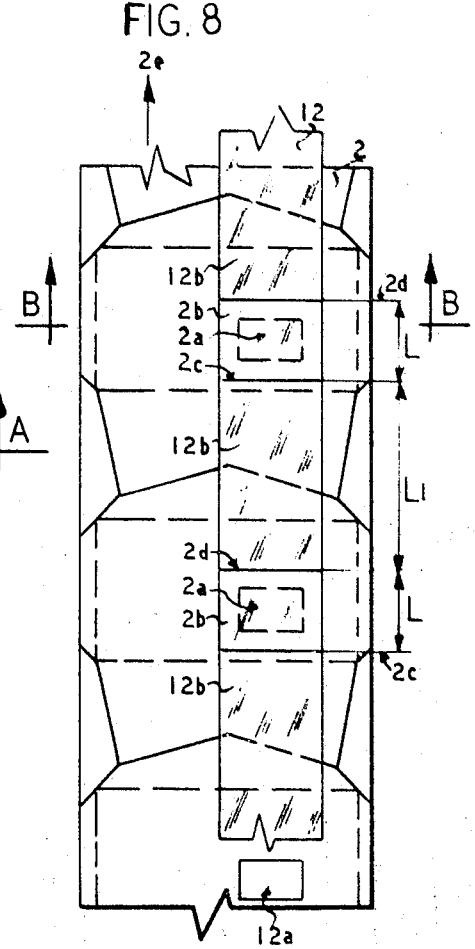
FIG. 8 is a plan of an envelope paper web with a plastic film covering.
Figure 9:
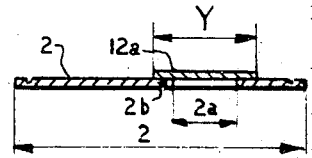
FIG. 9 is a section on B—B of FIG. 8.

Description related to FIGS. 8 and 9

FIG. 8 shows a plastic film strip 12 relative to a running envelope paper web 2 moving in a direction shown by the arrow 2e. At this stage the window already cut out. Cut-out portion 2a of length L is bonded peripherally to the paper web around the cut-out 2a. The rest of the film 12b is not bonded to the paper and is not utilized. The film is cut off along lines 2f and 2g separated by a distance L1. The part not bonded is cooled by cold air jets from the manifolds 18 and perforations 18a shown in FIGS. 2 and 4, and is drawn off through the cavity 24 into the hollow shaft 20 of the cooling cylinder as before described.

FIG. 9 shows the plastic window cover in section, overlaying the envelope paper cut-out 2a and bonded peripherally at 2b.

What is claimed is:

1. Apparatus for continuously forming thermoplastic film windows on a running web of sheet material, the apparatus including in combination,
    (a) means for cutting a window opening cut-out in the running web,
    (b) a preheated cylinder,
    (c) a cooling cylinder having a cylindrical side wall, a depression being formed therein, the depression having a depressed floor area defined by spaced circumferential side walls and first and second end walls, and a cooling surface being defined on the cylindrical side wall between the end walls of the depression,
    (d) a pressure cylinder in operative engagement with the cooling cylinder, providing a nip between the pressure cylinder and the cooling surface,
    (e) means for extruding a strip of thermoplastic material on to the cooling cylinder in advance of the nip, the strip having a width greater than that of the window opening to provide peripheral sealing, and being aligned with the web at the nip so as to cover the window opening providing for peripheral sealing as aforesaid, the strip extending over the cooling surface,
    (f) an electrostatic pinning applicator bar producing an electrostatic charge adapted to pin the extruded film to the cooling roll in advance of the nip,
    (g) means to cut the thermoplastic film in advance of the nip, adapted to provide a plastic window portion longer than the window opening cut-out for peripheral sealing in the nip,
constructed and arranged for the moving web, after having had window opening cut-outs cut therein, to pass around the preheated cylinder, thence through the nip in contact with the extruded plastic window portion being bonded to the web peripherally of the cut-out in passing through the nip in mutual contact.

2. Apparatus as defined in claim 1; the depressed floor having first and second slots defined in part by the first and second ends walls, a first blade in the first slot and a second blade in the second slot; means to extend the first blade through the first slot in advance of the nip, cutting a following edge of the plastic window portion as it extends, and means to retract the first blade before it reaches the nip; and means similarly to extend and retract the second blade to cut a trailing edge of the plastic window portion; providing successively cut film window portions spaced by cut-off sections of the film.

3. Apparatus as defined in claim 2, the cooling cylinder having a hollow shaft, a cavity communicating therewith and opening from the depressed floor aforesaid, compressed air means directing jets of air against the cut-off section of the thermoplastic strip urging the cut-off section to enter the cavity for discharge through the hollow shaft, for recovery.

4. Apparatus as defined in claim 3, and suction means cooperating with the hollow shaft aforesaid to assist discharge of the cut-off section through the hollow shaft.

5. Apparatus as defined in claim 4 the cavity having walls of ceramic material so that the cut-off section passes therethrough unimpeded by electrostatic adhesion.

6. Apparatus as defined in claim 1, with compressed air jet means to cut the thermoplastic film, producing a plastic window portion and a cut-off section.

7. Apparatus as defined in claim 6, the cooling cylinder having a hollow shaft, a cavity communicating therewith and opening from the depressed floor aforesaid, compressed air means directing jets of air against the cut-off section of the thermoplastic strip urging the cut-off section to enter the cavity for discharge through the hollow shaft, for recovery.

8. Apparatus as defined in claim 1, the extruding means being adapted to extrude a strip having a thickened edge.

9. Apparatus as defined in claim 8, the extruding means also being adapted simultaneously to extrude a second strip having a thickened edge, with the thickened edge being adjacent and defining a window having a slot with reinforced edges.

10. Apparatus as defined in claim 1 and a static bar adapted to remove the electrostatic charge when the moving web has passed through the nip.

References Cited

UNITED STATES PATENTS

| 2,723,604 | 11/1955 | Fischer | 93—61A |
| 3,048,088 | 8/1962 | Fischer et al. | 93—61A |
| 3,112,680 | 12/1963 | Hein et al. | 93—61A |
| 3,421,960 | 1/1969 | Arbit | 156—500X |
| 3,421,964 | 1/1969 | Arbit | 156—500X |
| 3,470,055 | 9/1969 | Wade | 156—500X |

SAMUEL W. ENGLE, Primary Examiner

U.S. Cl. X.R.

93—61; 156—244, 514